(12) United States Patent
Shober et al.

(10) Patent No.: US 6,243,012 B1
(45) Date of Patent: *Jun. 5, 2001

(54) INEXPENSIVE MODULATED BACKSCATTER REFLECTOR

(75) Inventors: R. Anthony Shober, Red Bank; Eric Sweetman, Princeton; Gregory Alan Wright, Colts Neck, all of NJ (US)

(73) Assignee: Lucent Technologies Inc., Murray Hill, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/774,499

(22) Filed: Dec. 31, 1996

(51) Int. Cl.⁷ .................................................. H04Q 1/00
(52) U.S. Cl. .................................. 340/572.7; 340/10.34; 340/10.1
(58) Field of Search .............................. 340/825.54, 572, 340/573, 572.7, 572.5, 10.34, 10.1, 572.2; 342/42, 44; 455/38.2, 45

(56) References Cited

U.S. PATENT DOCUMENTS

| | | |
|---|---|---|
| 3,944,928 | 3/1976 | Augenblick et al. . |
| 3,984,835 | 10/1976 | Kaplan et al. . |
| 4,075,632 | 2/1978 | Baldwin et al. . |
| 4,347,512 | 8/1982 | Sweeney . |
| 4,360,810 | 11/1982 | Landt . |
| 4,471,345 | 9/1984 | Barrett, Jr. . |
| 4,510,495 | 4/1985 | Sigrimis et al. . |
| 4,641,374 | 2/1987 | Oyama . |
| 4,691,202 | 9/1987 | Denne et al. . |
| 4,739,328 * | 4/1988 | Koelle ....................... 342/42 |
| 4,816,839 | 3/1989 | Landt . |
| 4,827,395 * | 5/1989 | Anders ..................... 340/10.1 |
| 4,864,312 | 9/1989 | Huiguard et al. . |
| 4,888,591 | 12/1989 | Landt et al. . |
| 4,937,581 | 6/1990 | Baldwin et al. . |
| 4,963,887 | 10/1990 | Kawashima et al. . |
| 5,030,807 | 7/1991 | Landt et al. . |
| 5,214,409 | 5/1993 | Beigel . |
| 5,305,459 | 4/1994 | Rydel . |
| 5,339,073 | 8/1994 | Dodd et al. . |
| 5,347,263 | 9/1994 | Carroll et al. . |
| 5,420,757 | 5/1995 | Eberhardt et al. . |
| 5,426,667 | 6/1995 | van Zon . |
| 5,448,242 * | 9/1995 | Sharpe ......................... 342/42 |
| 5,461,385 | 10/1995 | Armstrong . |
| 5,477,215 | 12/1995 | Mandelbaum . |
| 5,479,160 * | 12/1995 | Koelle .................... 340/825.54 |
| 5,479,416 | 12/1995 | Snodgrass et al. . |
| 5,491,482 | 2/1996 | Dingwall et al. ............. 342/42 |
| 5,525,993 * | 6/1996 | Pobanz ......................... 342/44 |
| 5,525,994 * | 6/1996 | Hurta ............................ 342/44 |
| 5,640,683 * | 6/1997 | Evans ............................ 455/45 |
| 5,649,295 * | 7/1997 | Shober ....................... 455/38.2 |
| 5,649,296 * | 7/1997 | MacLellan ................. 455/38.2 |

FOREIGN PATENT DOCUMENTS

| | | |
|---|---|---|
| 0 324 564 A2 | 7/1989 | (EP) . |
| 08007062 | 1/1996 | (JP) . |

\* cited by examiner

*Primary Examiner*—Brian Zimmerman
(74) *Attorney, Agent, or Firm*—Steve Mendelsohn

(57) ABSTRACT

The present invention provides for an inexpensive RFID Tag design which uses an inexpensive Backscatter Modulator. The modulator is simply a CMOS gate driven by a shift register containing a modulating signal. The CMOS gate is connected to the antenna such that it modulates the reflectivity of the antenna in accordance with the modulating signal. In a second embodiment, the Tag is incorporated into a single CMOS integrated circuit which comprises all of the components, except for the antenna, necessary to implement an inexpensive read-only RFID Tag.

13 Claims, 6 Drawing Sheets

INEXPENSIVE MODULATED BACKSCATTER REFLECTOR

RELATED APPLICATIONS

Related subject matter is disclosed in the following applications filed concurrently herewith and assigned to the same Assignee hereof: U.S. patent applications "Shielding Technology in Modulated Backscatter System," Ser. No. 08/777,770, abandoned Feb. 27, 1999; Encryption for Modulated Backscatter Systems, allowed May 25, 1999" Ser. No. 08/777,832 now U.S. Pat. No. 6,130,623; "QPSK Modulated Backscatter System," Ser. No. 08/775,694; "Modulated Backscatter Location System," Ser. No. 08/777,643, allowed May 25, 1999 now U.S. Pat. No. 6,046,683; "Antenna Array In An RFID System," Ser. No. 08/775,217 now U.S. Pat. No. 6,184,841; "Subcarrier Frequency Division Multiplexing Of Modulated Backscatter Signals," Ser. No. 08/777,834, abandoned, May 24, 1999; "IQ Combiner Technology In Modulated Backscatter System," Ser. No. 08/775,695, now U.S. Pat. No. 5,784,686; "In-Building Personal Pager And Identifier," Ser. No. 08/775,738, abandoned, Jan. 26, 1999; "In-Building Modulated Backscatter System," Ser. No. 08/775,701, allowed, Apr. 9, 1999 now U.S. Pat. No. 5,952,922; "Modulated Backscatter Sensor System," Ser. No. 08/777,771, allowed Mar. 30, 1999 U.S. Pat. No. 6,084,630; "Passenger Baggage, And Cargo Reconciliation System," Ser. No. 08/782,026 now abandoned. Related subject matter is also disclosed in the following applications assigned to the same assignee hereof: U.S. patent application Ser. No. 08/504,188, entitled "Modulated Backscatter Communications System Having An Extended Range" now U.S. Pat. No. 5,640,683; U.S. patent application Ser. No. 08/492,173 entitled "Dual Mode Modulated Backscatter System,"; issued on Jul. 15, 1997, now U.S. Pat. No. 5,649,295, U.S. patent application Ser. No. 08/492,174, entitled "Full Duplex Modulated Backscatter System,"; issued Jul. 15, 1997, now U.S. Pat. No. 5,649,296 and U.S. patent application Ser. No. 08/571,004, entitled "Enhanced Uplink Modulated Backscatter System", allowed Dec. 1, 1998 as U.S. Pat. No. 5,940,006.

FIELD OF THE INVENTION

This invention relates to wireless communication systems and, more particularly, to a wireless communication system using modulated backscatter technology.

BACKGROUND OF THE INVENTION

Radio Frequency Identification (RFID) systems are used for identification and/or tracking of equipment, inventory, or living things. RFID systems are radio communication systems that communicate between a radio transceiver, called an Interrogator, and a number of inexpensive devices called Tags. In a Modulated BackScatter (MBS) RFID system, the Interrogator communicates to the Tags using modulated radio signals. The Tags communicate with the Interrogator by reflecting (backscattering) back to the Interrogator a Continuous Wave (CW) carrier signal originally transmitted by the Interrogator. Communication originating from the Interrogator and transmitted to the Tag is called the Downlink. Communications from the Tag to the Interrogator is called the Uplink. The Tag has an antenna which it uses to receive messages from the Interrogator and to reflect messages back to the Interrogator. After transmitting a message to the Tag, the Interrogator transmits the CW carrier signal to the Tag. The Tag uses the CW carrier signal to respond to the Interrogator message by reflecting or backscattering the CW carrier signal with the modulated subcarrier signal. The CW carrier signal is typically a signal in the microwave frequency range. The reflected or backscattered CW carrier signal is modulated by the Tag with a modulating signal that is generated at the Tag.

In most RFID systems using MBS, the Tag antenna radar cross-section, i.e., the effective reflective area of the antenna, is modulated by alternately biasing ON and OFF a high-quality microwave diode attached to the antenna. When the diode is in its conducting state, i.e., the diode is biased in the ON state, the diode acts as an RF short circuit. When in the OFF state, the diode acts as an RF open circuit. In this manner the impedance or reflectivity of the antenna is modulated which causes the antenna to alternately reflect and absorb the impinging CW carrier signal. Connected to the correct location on the antenna, such as a feedpoint of an antenna, the conducting diode changes a tuned antenna into a detuned antenna causing the antenna to reflect rather than absorb the impinging CW RF signal.

A modulated backscatter RFID tag is sometimes referred to as a passive radio tag in that it reflects and modulates a continuous wave (CW) radio signal with which it is illuminated in an analogous way to a mirror which can be used for communicating by flashing the light from the sun to an observer at a distance. FIG. 1 illustrates a typical read-only modulated backscatter RFID system comprising an Interrogator 105 and a Tag 101. Tag 101 comprises a microprocessor 102, a modulator 103 and an antenna 104. Within the Interrogator 105, the Reader RF Unit 108 generates and transmits a CW signal by means of the Transmit Antenna 106. This signal illuminates the Tag Antenna 104 which reflects (or backscatters) a portion of the incident signal. The reflection coefficient or reflectivity of the antenna, a parameter well known to those in the field of antenna design which indicates an antenna's ability to reflect energy within a certain frequency range, is modulated directly by a modulating signal. The reflection coefficient of the Tag Antenna 104 is switched between being a good absorber of energy to a good reflector in a time-varying pattern (modulating signal) determined by the data stored in the tag memory. The variable reflection coefficient of the Tag Antenna 104 modulates the backscattered RF signal. This backscattered signal is captured by the Interrogator Receive Antenna 107, amplified and down-converted by the Reader RF Unit 108 and the data recovered by the Demodulator 109, Digital Signal Processor (DSP 110 if present) and Microprocessor ($\mu$P) 111.

One of the more important factors that affect directly the overall sensitivity of the RFID System is the efficiency with which the Tag Antenna 104 modulates the reflected RF signal. This, in turn, depends upon the Tag Antenna 104 radar cross-section the impedance matching between the Tag Antenna 104, the Tag Modulator 103, and the quality of the Tag Modulator 103. The Tag Modulator 103, for optimum system performance, is usually a high-quality microwave semiconductor, often a switching diode. For an inexpensive Tag 101, this device alone can constitute a major part of the total Tag cost. Thus, in order to significantly reduce the cost of manufacture of the Tag, the cost of Modulator 103 must be reduced while still maintaining acceptable system sensitivity and range. There are RFID system applications in which high sensitivity and long range are less important than low cost. One such class of applications includes tracking airline luggage. Therefore, there is a need to design a relatively inexpensive Tag for such systems.

SUMMARY OF THE INVENTION

In accordance with the present invention an inexpensive Tag design used in an RFID communication system that uses MBS is claimed. The Tag comprises a data storage device, a variable impedance semiconductor gate electrically connected to the data storage device for receiving the stored information and an antenna having a certain reflectivity. The antenna is electrically connected to the variable impedance device which modulates the reflectivity of the antenna in accordance with the received information. In another embodiment, all of the parts of the Tag are incorporated into an integrated circuit which also modulates the reflectivity of the antenna.

DETAILED DESCRIPTION

The present invention claims an inexpensive modulator for an RFID system for short range applications. An inexpensive Complementary Metal Oxide Semiconductor (CMOS) gate is used in place of the typically used high quality diode to modulate the reflectivity or impedance of an MBS antenna simplifying the Tag design and significantly reducing cost of manufacture of the Tag and overall system cost.

Figure 1:
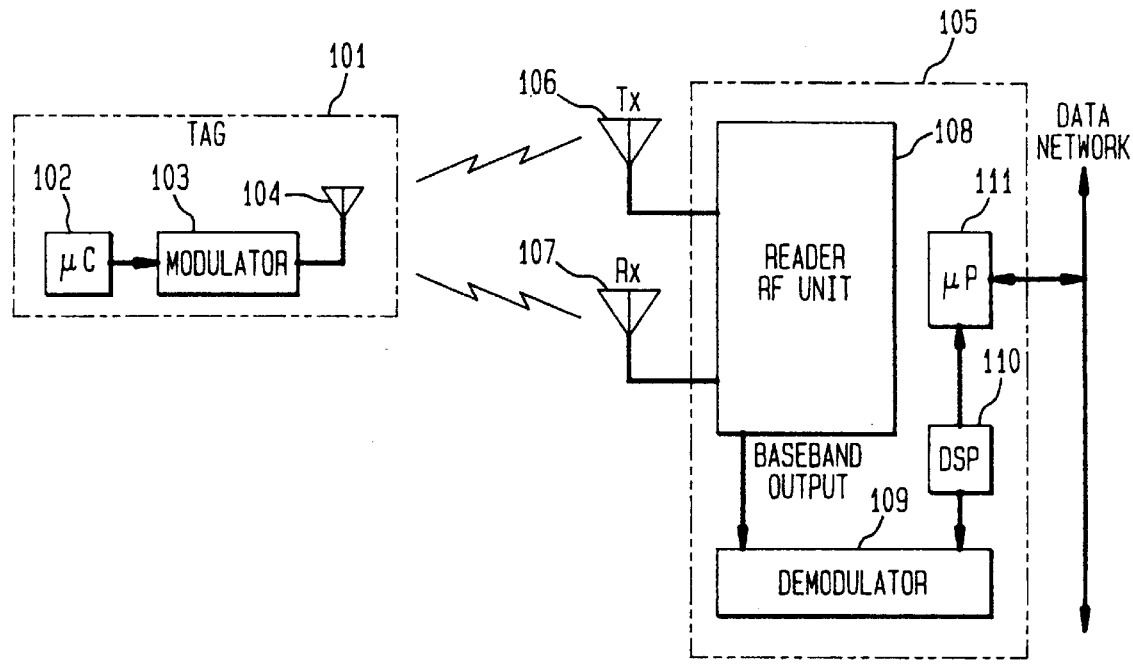
FIG. 1 shows a block diagram of an illustrative Radio Frequency Identification (RFID) system.
Figure 2:
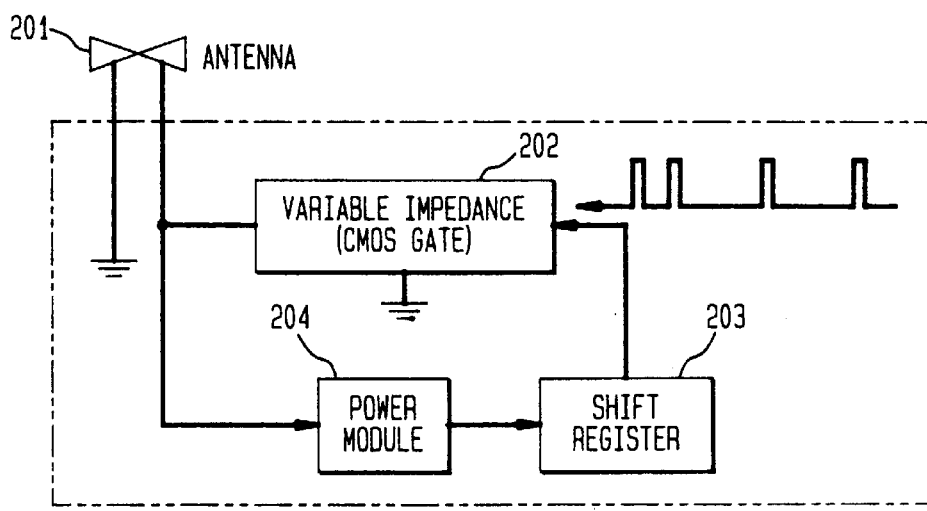
FIG. 2 shows a block diagram of an inexpensive Tag Unit for use in the RFID system of FIG. 1.

FIG. 2 shows a block diagram of the present invention, a simple read-only tag, for applications such as tracking airline luggage. Information such as encoded data stored in the Tag Shift Register 203, is used to drive a Variable Impedance device 202, a CMOS gate in this embodiment, coupled to the Tag Antenna 201. Other Data Storage devices such as a Read Only Memory (ROM) or similar devices can be used instead of a shift register to drive the Variable Impedance device 202. Variable Impedance device 202 receives the encoded data and modulates the reflectivity of Antenna 201 in accordance with the encoded data. The Power Module 204, in this embodiment, is either an inexpensive battery or a rectifier which draws its power from the illuminating RF. This invention would constitute an important element of a low cost, read-only RFID Tag for short range applications such as airline baggage tracking. Using a CMOS Gate 202 for this purpose has the advantage over other modulation schemes of low cost and low power usage. This type of Tag is used for short range applications (less than 2 meters) due to the less efficient Variable Impedance device and, in the case in which the Tag is RF-powered, rapid fall off of RF power with distance from the Interrogator. The use of an inexpensive CMOS Gate 202 as a modulating element for a Modulated Backscatter RFID Tag such as the one depicted in FIG. 1 will now be described.

Figure 3:
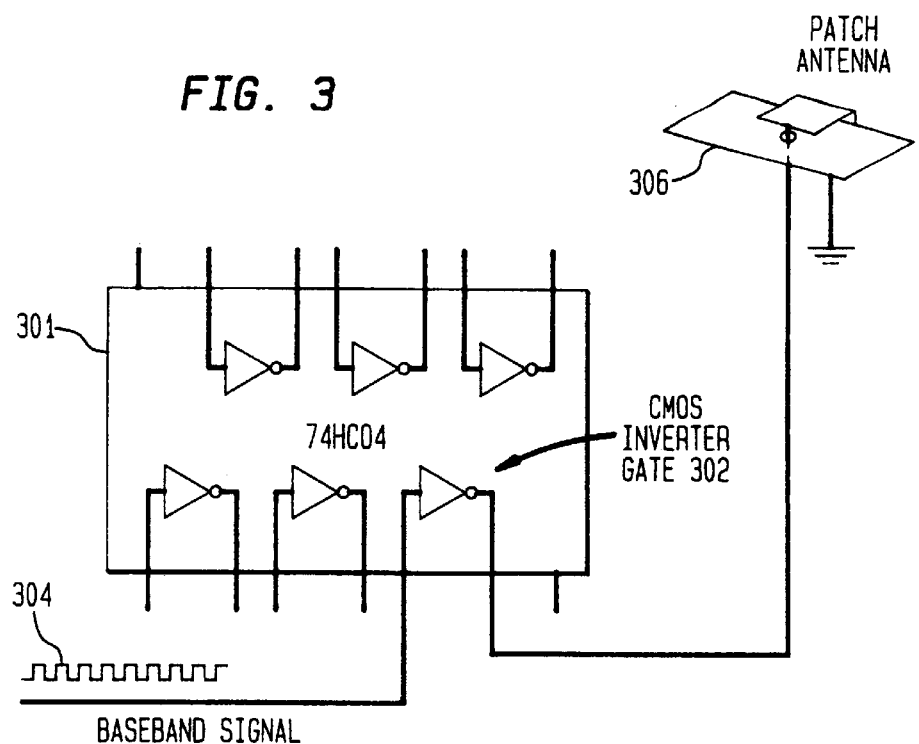
FIG. 3 shows a block diagram of a Demonstration Layout using a Complementary Metal Oxide Semiconductor (CMOS) inverter output gate from a 74HC04 to modulate a Bowtie Antenna.

FIG. 3 is a block diagram of a simple test circuit which demonstrates how a simple CMOS Inverter Gate 302 can be used as a modulating element in an MBS Tag such as the one depicted in FIG. 2. In this case, an Inverter Gate 302 from a 74HC04 high-speed CMOS integrated circuit 301 was used, driven by a baseband signal 304, which in this case was a Square Wave Signal from a signal generator. The output of the Inverter Gate 302, in this instance, was connected to the feed-point of a ¼-wave Patch Antenna 306. Other antennas have been tested with this circuit including bowtie, loop and ½-wave dipole configurations.

Figure 4:
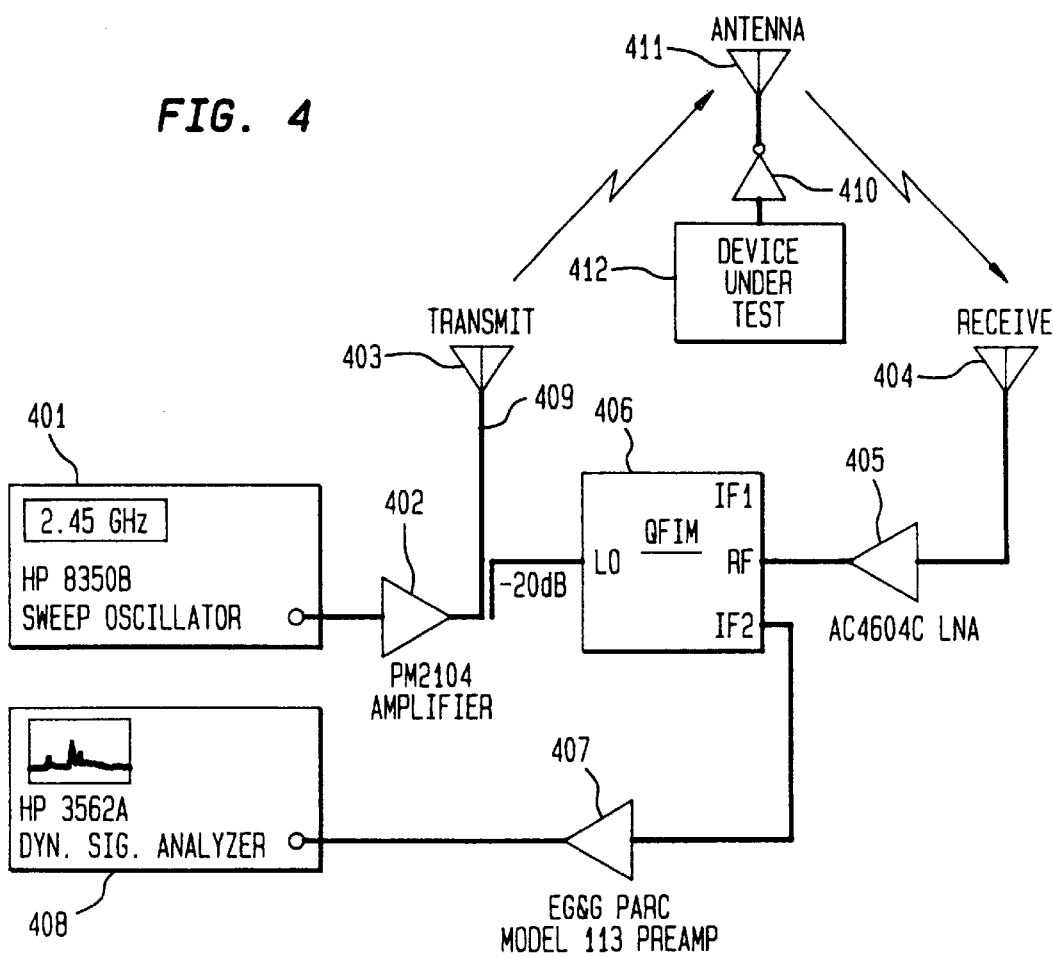
FIG. 4 shows a Test Layout for evaluating the circuits in FIGS. 3 and 8.

The test bench used to evaluate the circuit in FIG. 3 was also used in subsequent experiments and is shown in FIG. 4. A microwave Sweep Oscillator (HP 8350B) 401, operating at a 2.45 GHz CW frequency, drives a Power Amplifier (PM2104) 402 with an output of +30 dBm (1 watt). This signal is transmitted by a Planar Antenna 403 with an 8.5 dBi gain, illuminating the Circuit Under Test 412 (Tag circuit). The output of circuit 412 is buffered by inverter gate 410 which also drives antenna 411. The backscatter signal is received by a Receive Antenna 404 and amplified by a Low Noise Amplifier (LNA) 405. The LNA output is mixed with an attenuated (−20 dB) Sample 409 of the original CW transmit signal in a Quadrature IF Mixer (QIFM) 406. The output of QIFM 406 is a baseband replica of the signal which modulates the reflectivity of the antenna on the test circuit or Tag. This weak baseband signal is amplified and displayed on a Spectrum Analyzer (HP 3562A) 408.

Figure 5:
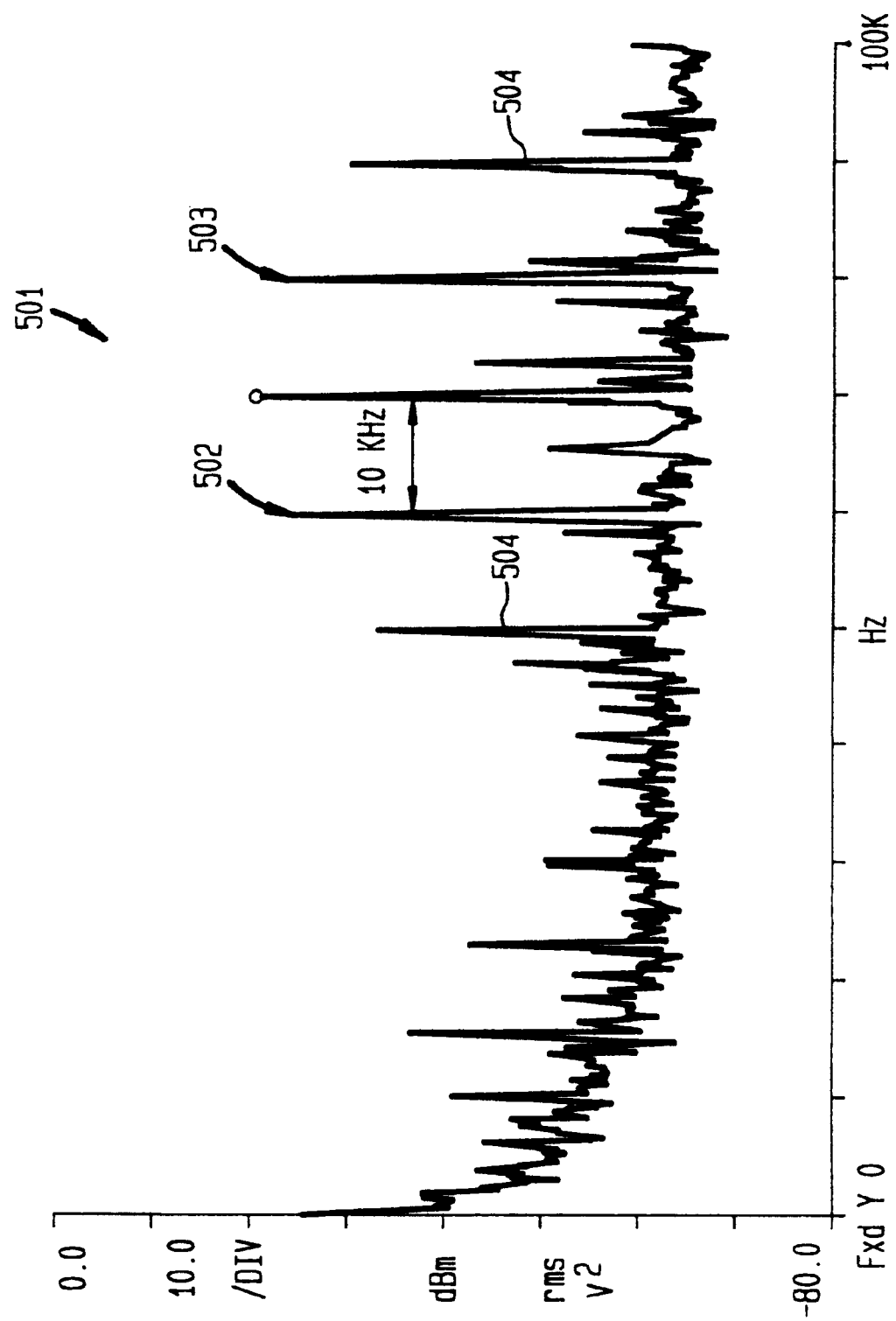
FIG. 5 shows the detected Modulated Backscatter signal from the circuit in FIG. 3.

FIG. 5 shows the Spectrum Analyzer plot 501 of one of the tests performed with the circuit of FIG. 3. In this instance, the drive signal, i.e., baseband signal 304, was a frequency shift keyed (FSK) square wave alternating between 60 kHz and 80 kHz at a 10 kHz rate. The plot displays peaks 502 and 503 not only at 60 and 80 kHz but peaks 504 at 10 kHz sidebands generated by the switching rate. Additional tests were conducted with an Exclusive OR (XOR) gate instead of an inverter and with a different drive signal. All tests yielded similar results. It should be noted that the circuit of FIG. 3 and indeed this invention can be implemented with other logic gates such as AND, OR, NOR, NAND gates and the like.

Figure 6:
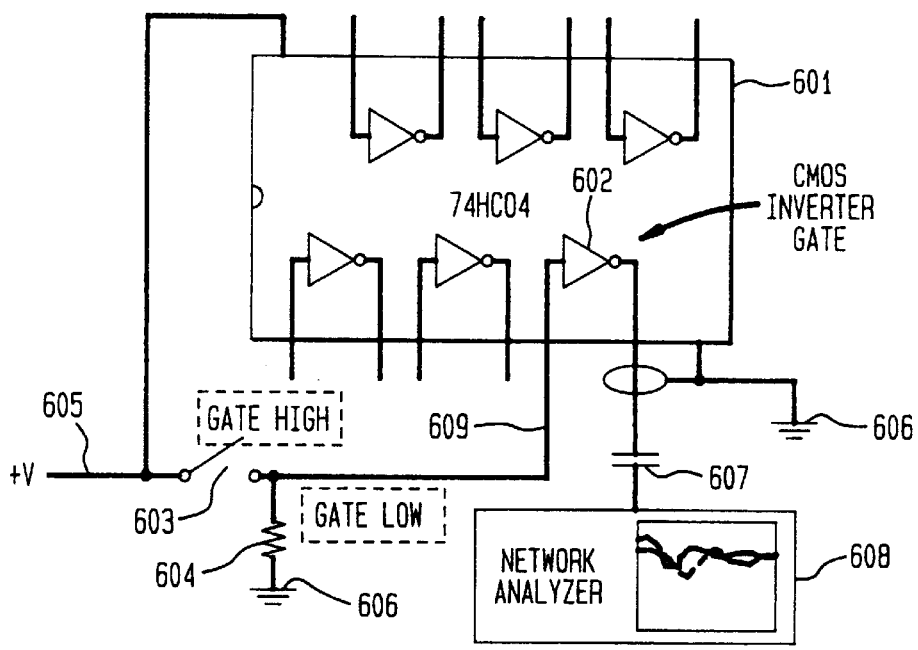
FIG. 6 shows a Test Layout for measuring the change in the output impedance of a CMOS inverter gate (74HC04) when the gate input is changed from low to high.
Figure 7:
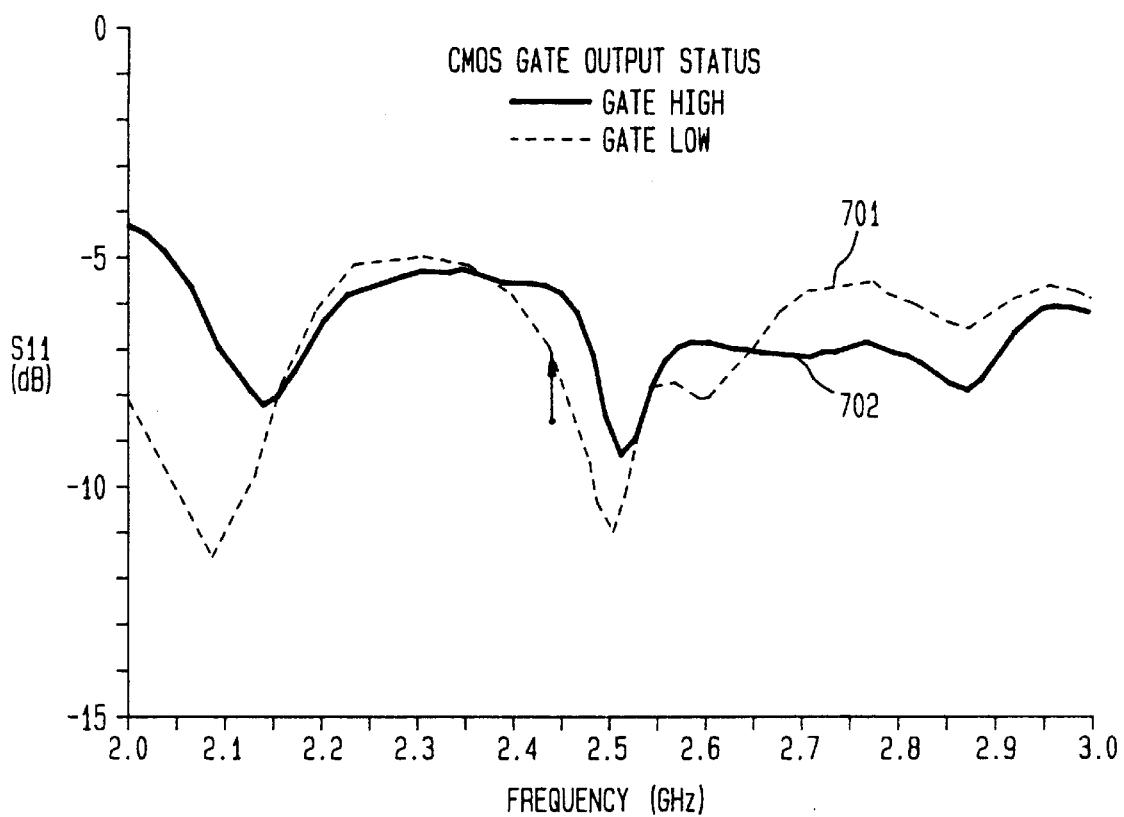
FIG. 7 shows the network analyzer measurement of the circuit in FIG. 6 from the setup in FIG. 6.

FIG. 6 shows a battery-powered test circuit designed to measure directly the impedance change of a CMOS Inverter Gate from a 74HC04 high-speed CMOS integrated circuit 601 at the microwave frequency range of interest. The output of CMOS inverter 602 is connected to an RF coaxial connector (SMA). The Gate Input 609 is connected to a Bias Switch 603 with which to change the input bias from high to low. One end of Resistor 604 is connected to input 609 of gate 602 while the other end of Resistor 604 is connected to digital ground 606. One end of Bias Switch 603 is connected to +V volts where V is equal to a voltage level recognized as a logical HIGH by CMOS gates. V is typically equal to +5 volts. Using DC blocking capacitor 607 to prevent pulling the gate output to ground, the circuit is connected to the output port of a Network Analyzer 608. The single port scattering parameter (S11), shown in FIG. 7, was measured between 1 and 3 GHz with the gate output HIGH and LOW, comparing the two curves 701, 702. S11 is a measure of the amount of signal that is reflected back toward the signal source, i.e., the Network Analyzer. No attempt was made to optimize the coupling between the Network Analyzer and the test circuit but, at 2.45 GHz when the output state is switched, S11 exhibits a 2–3 dB change. Another measurement was made with an XOR gate (74HC86) with similar results. While this 2–3 dB change is a smaller effect than would be produced by a high-quality biased diode, the observed effect is large enough for short-range RFID applications. More importantly, the cost is substantially less. In addition, aside from leakage current, the CMOS gate draws current only during transitions, resulting in much lower power requirements, critical for a low-power battery-powered Tag.

Figure 8:
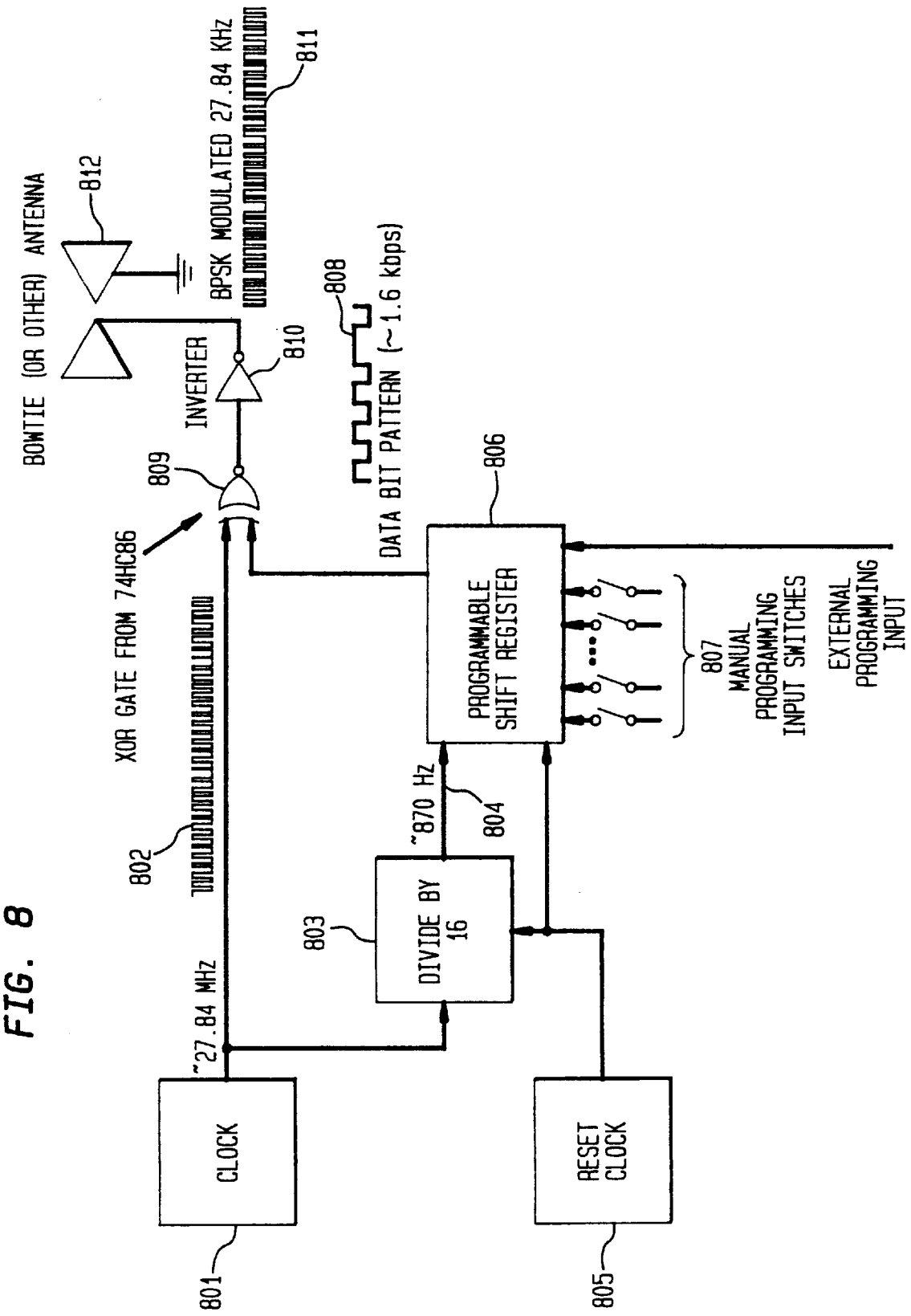
FIG. 8 shows a block diagram of a test circuit simulating the Tag Unit shown in FIG. 2.

FIG. 8 is a block diagram of a simulated single-chip CMOS RFID Tag, assembled with discrete 74HC integrated circuits. It differs from a fully functional Tag 101 in that it has Manual Programming Switches 807 and an onboard battery (not shown). The circuit includes a 27.7 kHz Clock 801 which generates the Subcarrier 802. This frequency is divided by 16 by circuit 803 whose output toggles a D flip-flop (not shown) resulting in 870 Hz clock 804 which drives Programmable Shift Register 806. Reset clock circuit 805 is used to reset circuits 806 and 802 when the Tag is initially powered. The Programmable Shift Register 806 Output Datastream 808 and the Subcarrier 802 are applied to the two inputs of an XOR Gate 809, resulting in an output carrier whose phase alternates with each alternation of the data stream. This gate output signal, which uses Binary Phase Shift Keyed modulation (BPSK), is buffered by a single Inverter Gate 810 which is connected to one leg of a Bowtie Antenna 812, tuned to about 2.5 GHz. The other antenna leg is connected to ground.

The circuit is tested as displayed in FIG. 4, as previously described above in the test performed on the circuit in FIG. 3. A +30 dBm CW 2.45 GHz signal from the Transmit Antenna 403 illuminates the Bowtie Antenna 411. The backscattered signal, BPSK-modulated by the CMOS Gate/Antenna combination, is picked up by the Receive Antenna 404 and mixed down to the subcarrier frequency. This signal, after amplification, is displayed on a Spectrum Analyzer 408.

Figure 9:
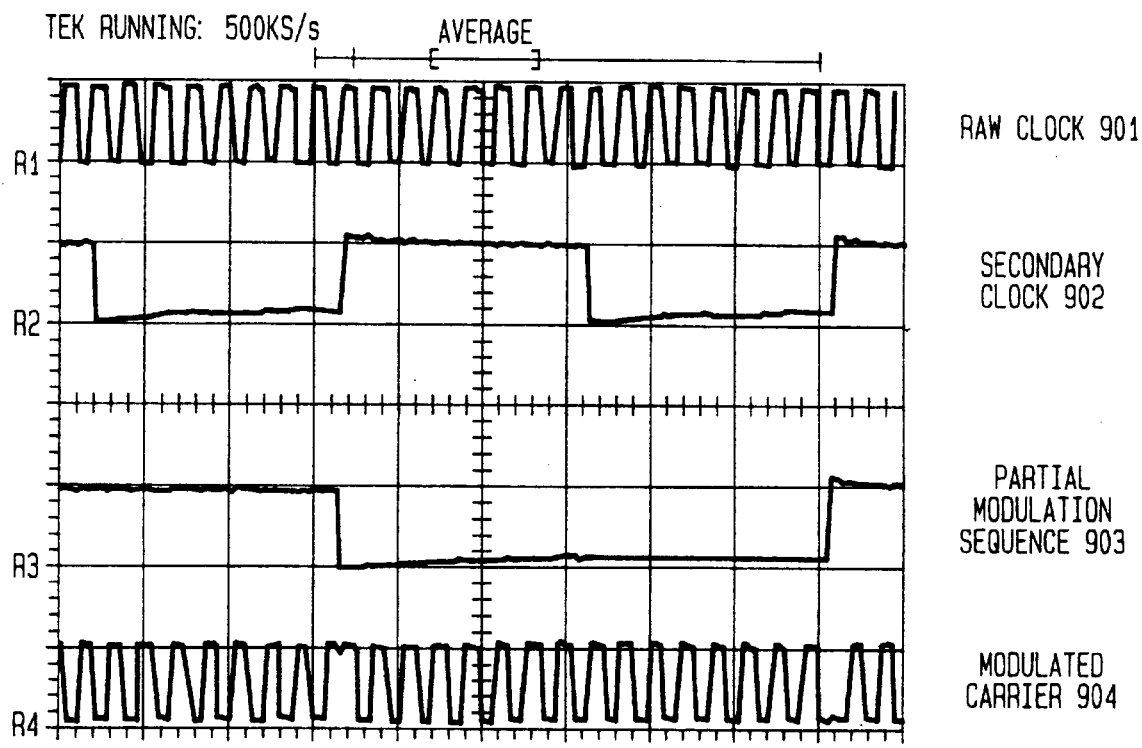
FIG. 9 shows the signals within the circuit of FIG. 8.

FIG. 9 displays the signals generated within the Simulated Tag operating at a clock frequency of 27.7 kHz using an XOR gate as a modulator as shown in FIG. 8. The top trace is the unmodulated Raw Clock 901. Beneath this is the Secondary Clock trace 902, which is the primary frequency divided by 16. The Secondary Clock 902 is used to strobe the shift register data output to the XOR modulator gate. The third trace, the Partial Modulation Sequence 903, is a portion of this data sequence showing two transitions. The final trace, the Modulated Carrier 904, is the BPSK modulated carrier output from the XOR gate. Notice the change of phase corresponding to each transition of the data. This is the signal which drives the CMOS Inverter Gate 810 of FIG. 8 whose output is the modulating element connected to the Tag Antenna 812.

Figure 10:
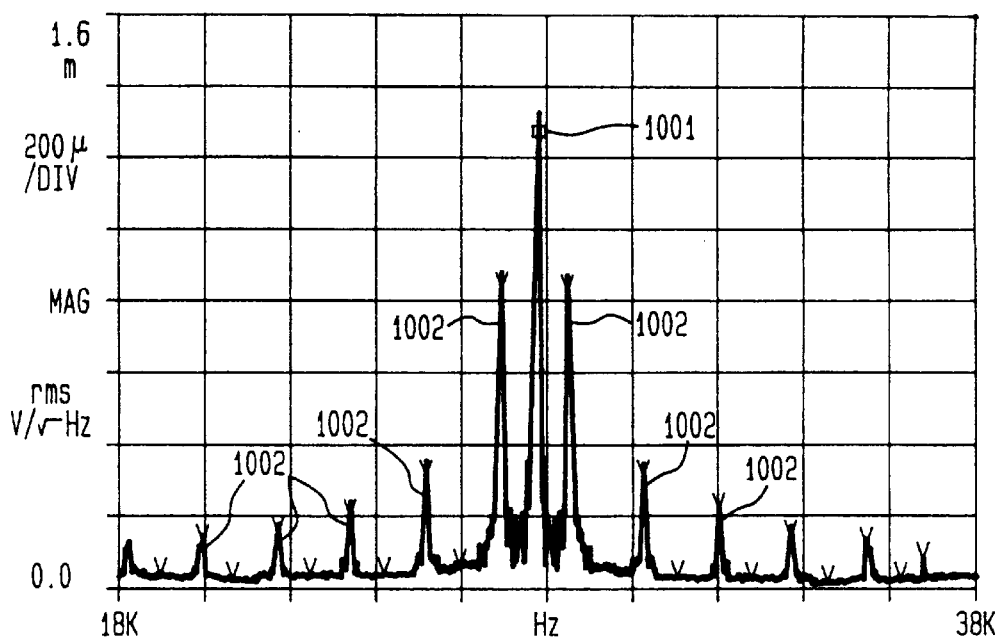
FIG. 10 shows a spectrum analyzer trace of the received signal from the Test Layout of FIG. 4.

FIG. 10 is a Spectrum Analyzer display of the downconverted MBS signal. Clearly evident is the Subcarrier Frequency (27.7 kHz) 1001 and the side bands 1002 at odd intervals of 870 Hz created by modulating data stream 808 (see FIG. 8) of the Tag unit shown in FIG. 2.

We claim:

1. A Tag for an RFID communication system using MBS comprising:
    a data storage device containing information;
    a modulator consisting of one CMOS semiconductor gate electrically connected directly at a first end of the semiconductor gate to the data storage device allowing the semiconductor gate to receive the information; and
    an antenna having a certain reflectivity and electrically connected directly to a second end of the semiconductor gate such that the CMOS semiconductor gate modulates the reflectivity of the antenna in accordance with the received information.

2. The Tag of claim 1 wherein the CMOS semiconductor gate is electrically connected directly at the first end of the semiconductor gate to a feed point of the antenna.

3. The Tag of claim 1 wherein the data storage device is a shift register.

4. The Tag of claim 1 wherein the CMOS semiconductor gate is an inverter gate.

5. The Tag of claim 1 wherein the CMOS semiconductor gate is an XOR gate.

6. The Tag of claim 1 wherein the CMOS semiconductor gate is an OR gate.

7. The Tag of claim 1 wherein the CMOS semiconductor gate is an AND gate.

8. The Tag of claim 1, wherein the Tag is a passive device, further comprising a power module electrically connected to the antenna to draw power from RF signals received at the antenna and electrically connected to supply the power to the data storage device to drive the received information to cause the CMOS semiconductor gate to modulate the reflectivity of the antenna.

9. The Tag of claim 1 wherein the CMOS semiconductor gate is other than a high quality diode gate.

10. A Tag for an RFID communication system using MBS comprising:
    an antenna having a certain reflectivity; and
    an integrated circuit electrically connected to the antenna for modulating the reflectivity of the antenna in accordance with information stored in the integrated circuit, wherein the integrated circuit comprises a data storage device for storing the information and a modulator consisting of one CMOS semiconductor gate connected directly at a first end of the semiconductor gate to the antenna and directly at a second end of the semiconductor gate to the data storage device for modulating the reflectivity of the antenna in accordance with the stored information.

11. The Tag of claim 10, wherein the Tag is a passive device, further comprising a power module electrically connected to the antenna to draw power from RF signals received at the antenna and electrically connected to supply the power to the data storage device to drive the received information to cause the CMOS semiconductor gate to modulate the reflectivity of the antenna.

12. The Tag of claim 10 wherein the CMOS semiconductor gate is other than a high quality diode gate.

13. A Tag for an RFID communication system using MBS comprising:
    a data storage device containing information;
    a modulator consisting of one CMOS semiconductor gate electrically connected to the data storage device allowing the semiconductor gate to receive the information; and
    an antenna having a certain reflectivity and electrically connected to the semiconductor gate such that the CMOS semiconductor gate modulates the reflectivity of the antenna in accordance with the received information, wherein the CMOS semiconductor gate is electrically connected directly to a feed point of the antenna.

* * * * *